June 23, 1970 W. WHITNEY 3,517,139
AUXILIARY TELEPHONE LINE CIRCUIT FOR CALL-WAITING SERVICE
Filed May 27, 1968
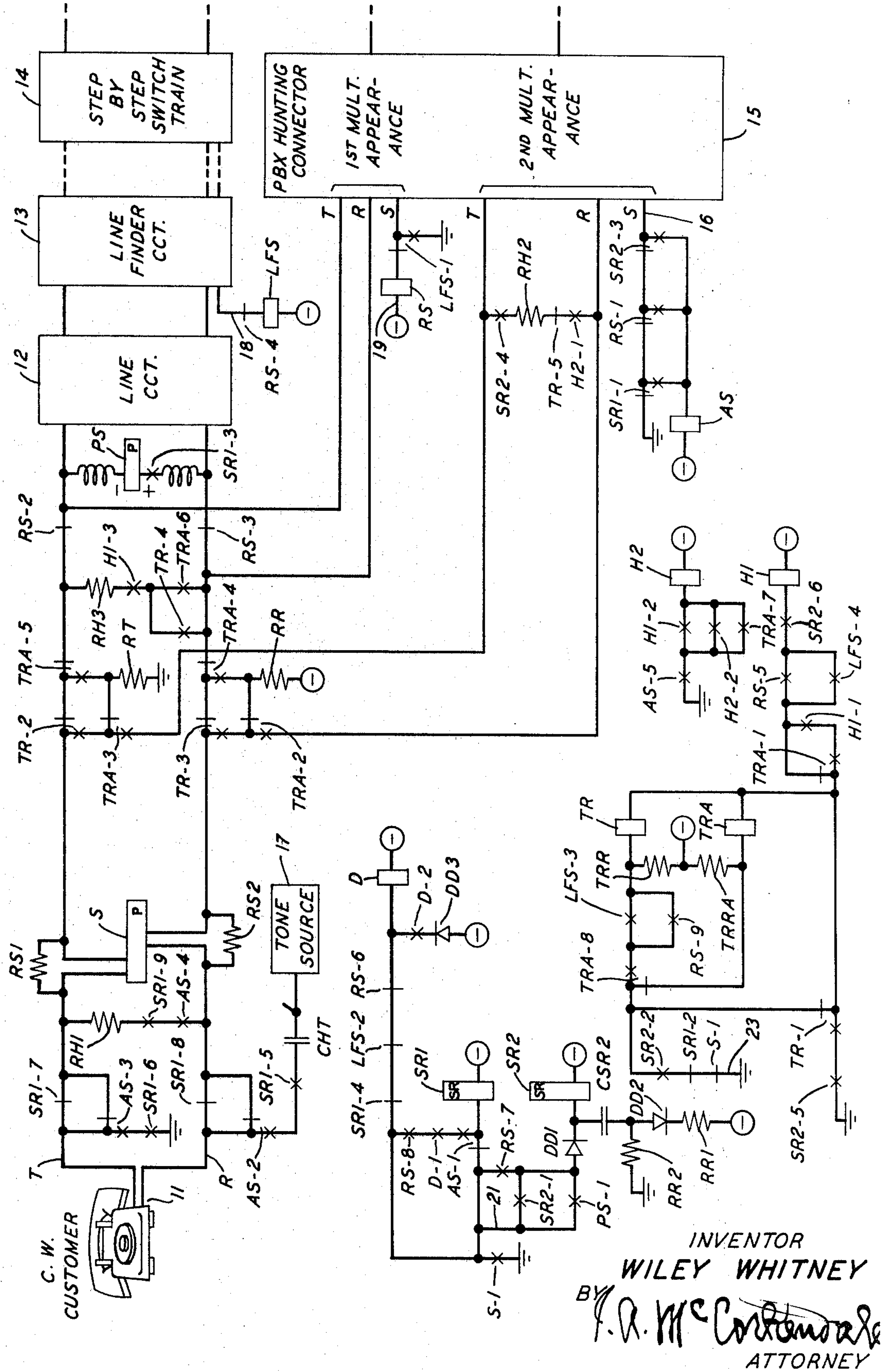
INVENTOR
WILEY WHITNEY
BY [signature]
ATTORNEY

3,517,139
AUXILIARY TELEPHONE LINE CIRCUIT FOR CALL-WAITING SERVICE

Wiley Whitney, Columbus, Ohio (2829 NE. 33rd Ct., Apt. 603, Fort Lauderdale, Fla. 33306)

Filed May 27, 1968, Ser. No. 732,420
Int. Cl. H04m 3/42
U.S. Cl. 179—18 4 Claims

ABSTRACT OF THE DISCLOSURE

An auxiliary line circuit for providing call-waiting service in step-by-step telephone systems includes means for preventing interference by a call-waiting connection with a call already being originated, but not yet completed, by the special-services customer. Completion of the call-waiting connection is prevented until battery potential to the call-waiting customer is reversed by completion of the customer-originated call.

My invention relates to telephone line circuits and more particularly to an auxiliary line circuit for providing call-waiting service to step-by-step telephone customers.

BACKGROUND OF THE INVENTION

In recent years, attendant upon the overall improvement and expansion of telephone switching systems in general, it has become feasible to provide to telephone customers many so-called "special services" which result in a more comprehensive and efficient performance both from the standpoint of the customer and the telephone companies. Among such special services is the important call-waiting service.

Call-waiting service, as the designation indicates, is a service whereby a "special service" customer, hereinafter referred to also as the "call-waiting customer," during the time his line is "busy" on a first call, may be informed, for example by an audible tone applied to his line, that a second call is waiting for connection to his line. If he desires, the customer may then interrupt the first call and answer the waiting call. Means are usually included whereby repeated transfers between the two calls can be made under control of the call-waiting customer.

While call-waiting services have already been provided on a limited basis and have performed quite satisfactorily in connection with certain types of telephone systems, the provision of this service in conjunction with telephone systems of the step-by-step type has heretofore involved perplexing problems stemming from the difficulty of preventing a call-waiting call from interfering with a call being originated by the special-services or call-waiting customer but not yet answered by the called customer at the time the call-waiting call connection is attempted. In view of the extensive and important continuing use of step-by-step telephone systems throughout the world, it is desirable of course that the various special services be provided in connection with such systems.

Accordingly, it is an object of my invention to improve call-waiting services.

Another object of my invention is to render feasible the provision of call-waiting service in a step-by-step telephone system.

A more specific object of my invention is to prevent interference by a call-waiting call connection with a call already being originated by the call-waiting customer but not yet completed to the called customer.

A still further specific object of my invention is to prevent completion of a call-waiting connection during periods when the call-waiting customer's line is busy on an operator-completed call.

Yet another object of my invention is to facilitate signaling the operator on operator-completed calls.

BRIEF DESCRIPTION OF THE INVENTION

In accordance with a specific illustrative embodiment of my invention, an auxiliary line circuit is connected between the normal line circuit, with which the special-services or call-waiting subscriber, or customer, is associated, and the normal line finder circuit. Also, separate terminations for the call-waiting customer, that is a first appearance and a second appearance, are provided on the PBX connector multiple via the auxiliary line circuit referred to; a hunting type connector is utilized. A polar relay is connected across the auxiliary line circuit, and, in accordance with the novel arrangement and features contemplated by my invention, completion of a call-waiting connection is prevented on a call-waiting customer originated call, unless, and until, this relay has operated. The polar relay referred to is operated by the potential reversal which takes place when a called party answers by going off hook, from which it follows that completion of a call-waiting connection can not take place until a call originated by the call-waiting customer has been answered by the called party.

A feature of my invention is a multi-appearance via an auxiliary line circuit of a call-waiting customer's line on the multiple of a hunting connector.

Another feature of my invention is a polarized relay operated upon current reversal by an answered call to permit completion of a call-waiting connection.

A still further feature of my invention is means whereby, on operator-completed calls, the operator can be signalled simply by a flash of the switchhook.

Still another feature of my invention is means for insuring that the call-waiting customer's line is closed through to the station when the call-waiting tone is applied.

Yet another feature of the invention is means for preventing completion of a call-waiting connection without at the same time applying the call-waiting signal to the customer's line.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing, the single figure of which shows schematically the general arrangement of an auxiliary line circuit for providing call-waiting service as contemplated by a specific illustrative embodiment of the invention.

DETAILED DESCRIPTION OF THE INVENTION

Referring now to the drawing, an auxiliary line circuit in accordance with a specific illustrative embodiment of the invention is shown connecting station set 11, presumed to be that of the special-service or call-waiting customer, to the associated line circuit 12 and thence through line finder circuit 13 to step-by-step switch train 14. As shown, and as will be described in detail subsequently, the auxiliary line circuit also provides two appearances for the customer's line on the multiple of hunting connector 15.

In order to avoid undue complication and enlargement of the disclosure, such standard items as line circuit, line finder, switch train, hunting connector and the like are shown as captioned rectangles only and are not disclosed in detail herein. These items are well known in the art and perform in their normal and well-understood manner in this connection. It is well known, for example, that in the instance of the hunting type connector, if the first appearance of the line on the connector multiple be found "busy" an attempt will automatically be made to complete to the second appearance. In the present instance the first appearance on the multiple will be held busy on calls originated by the call-waiting customer as well, of course, on incoming calls terminated on this first appearance while the call-waiting customer's line is idle. The second appearance will be held busy on calls originated by the call-waiting customer until dialing and other originating steps have been completed and the called station has answered by going off-hook. As will be discussed in detail subsequently, this means that on calls by the call-waiting customer to the attendant, or operator, and on "free" calls, the call-waiting feature will be temporarily inhibited. The second appearance on the multiple will also be held busy, on calls terminated to the call-waiting customer's line over the first appearance, until the call is answered by the call-waiting customer; attendant advantages of such feature will be discussed in detail subsequently.

(A) Calls originating from call-waiting customer station

For purposes of further description of the novel arrangement contemplated by my invention, the operation of the auxiliary line circuit will first be described in detail in connection with a call originated at call-waiting customer's station 11.

It will be noted that the drawing is of the "detached contact" type wherein individual contacts are shown separated from the relay windings which control them and wherein an "*x*" represents a normally open or "make" contact of a relay and a bar, shown intersecting a conductor at right angles, represents a normally closed or "break" contact of a relay; "normally" referring to the unoperated or released position of a relay. The principles of this type of drawing are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513. In the present disclosure each contact, or pair of contacts in the instance of a transfer pair, is given a designation comprising a prefix corresponding to that of the controlling relay followed by a digit identifying the particular contact of that relay. For example, the designation "SR1–5" is applied to #5 contact of relay SR1.

In the ensuing description the terms "on hook" and "hang up" will be used on occasion to designate the condition when the handset has been returned to the cradle upon "disconnect" by the customer, while the term "off hook" will be used to indicate the condition when the handset is removed from the cradle, for example, when originating a call.

When the customer goes off-hook and closes the line loop through station set 11, supervisory relay S, a low-impedance, double-wound relay, operates in series with the line relay provided in line finder circuit 13; this "starts" the line finder whereby to "find" the line appearance of this line in the normal and well-understood manner, to disconnect the line relay and to cut through the line via the line finder to battery and ground on the "calling" supervisory relay provided in step-by-step switch train 14. As is well-understood in the art, a "called" supervisory relay operates when a called party goes off-hook which relay operation is effective to reverse the battery and ground potential back to the calling party. This is an operation inherent in step-by-step telephone systems and is utilized in a novel manner, described in detail subsequently, in the present inventive arrangement.

At this point, that is, after the line has been cut through to the switch train, dial tone is transmitted to the call-waiting customer who may then proceed to dial the desired number. As the number is dialed, relay S operates and releases in step with the interruption of and reestablishment of the line loop resulting from the dial pulsing.

Relay SR1 operates following operation of relay S over a path from ground, make contact of transfer pair S–1, break contact of transfer pair AS–1, winding of relay SR1 to batter. Relay SR1 is slow-to-release and is sufficiently slow in action that the relay remains operated over the momentary releases of relay S during dialing. Relay SR1, operated, connects ground to sleeve lead 16 through the make contact of transfer pair SR1–1 whereby to make busy the second multiple appearance of the line at hunting connector 15; interrupts at break contact SR1–2 a yet-to-be-closed operate path for relays TR, TRA and H1; closes a path at make contact SR1–3 for connecting high impedance polarized relay PS across the tip and ring of the line; opens at break contact SR1–4 the operate path of relay D which operated following operation of relay S (make contact S–1); partially completes at make contacts SR1–5 and SR1–6 a path for subsequently applying "call-waiting" tone from tone source 17 to the call-waiting customer's line; interrupts at break contacts SR1–7 and SR1–8 the talking path to line finder circuit 13; and partially completes at make contact SR1–9 a holding path for the line finder connection. (Relay D, released as above described, had preformed no useful function in this series of actions.)

When the line is "found" by line finder 13 in the normal and well-understood manner, ground is applied to the sleeve lead 18 whereby relay LFS operates over an obvious path. Relay LFS, operated, connects ground via the make contact of transfer pair LFS–1 to the sleeve lead 19 whereby to make busy the first appearance of the line at connector 15, and at the same time interrupts at the break contact of the same transfer pair the operate path of relay RS. Also relay LFS, operated, partially completes at make contact LFS–4 a path over which relay H1 can operate on a call through the line finder.

It might be well to point out here that, at the time relay PS was first connected across the line as described above, the battery polarity (-on ring) was such that the polarized relay did not operate. However, now when dialing is completed and the called party responds to the ringing, the polarity on the line will be reversed by the switch train in accord with normal and well understood step-by-step switching operation and relay PS now operates (-on tip).

Relay PS, operated, closes a path for operating relay SR2 from ground, make contact S–1, lead 21, make contact PS–1, diode DD1, winding of relay SR2 to battery. Relay SR2 operates and locks to the ground just mentioned through its make contact SR2–1. Relay SR2, operated, partially completes at make contact SR2–2 an operate path for relays TR, TRA and H1; interrupts at the break contact of transfer pair SR2–3 the connection of ground to sleeve lead 16 of the line second appearance at connector 15 whereby to remove the "make busy" previously applied to this appearance and to "make idle" the appearance instead; and partially completes at make contact SR2–4 a holding bridge across the tip and ring of the second appearance at connector 15.

A marked slow-to-relaesse characteristic is imparted to relay SR2 by the connection in shunt with the operating path of the paths via lead 22 and capacitor CSR2 to battery via diode DD2 and resistor RR1 and to ground via resistor RR2.

Summarizing the above-described operations it will be immediately apparent that, in accordance with the novel arrangement contemplated by my invention, completion of a call-waiting call to the line during the time a call is being originated by the call-waiting customer is prevented since relay PS is in released position and both the first and second appearances of the line at connector 15 are made busy, the first appearance being busied by application of ground to sleeve 19 via the make contact of transfer pair LFS–1 and the second appearance being made busy by application of ground to lead 16 at the make contact of transfer pair SR1–1. However, as soon as the called party answers and relay PS operates the made busy condition is removed from the second appearance by disconnection of ground from sleeve lead 16 at the break contact of transfer pair SR2–3 and the second appearance of the line is made available to call-waiting call connections.

(B) Call terminating to idle call-waiting customer's station

For purposes of further disclosure of the novel arrangement contemplated by the invention, the steps involved in termination of a call incoming to an idle call-waiting station will now be described. Such call will terminate to the first appearance of the called line at connector 15 and relay RS will operate on the ground applied to sleeve lead 19 through the connector circuit.

Relay RS, operated, makes busy the second line appearance at PBX hunting connector 15 by connecting ground to sleeve lead 16 via the make contact of transfer pair RS–1; interrupts at respective break contacts RS–2, RS–3 and RS–4 the tip, ring and sleeve leads to line finder 13; partially completes at make contact RS–5 an operate path for relay H1; interrupts at break contact RS–6 the operate path of relay D; partially completes at make contact RS–7 an operate path for relay SR2; opens at the break contact of transfer pair RS–1 an operate path of relay AS; partially prepares at make contact RS–8 an operate path for relay SR1; and partially completes at make contact RS–9 an operate path for relay TR.

Ringing current is now supplied to station set 11 over the line through the respective windings of relay S; relay S does not operate fully on this current however. When the call-waiting customer answers the ringing by going off hook at station 11, relay S operates through the closed loop at station 11 and closes at the make contact S–1 operate paths for relays SR1 and SR2; the operate path for relay SR2 includes make contact RS–7.

While ground is applied to sleeve lead 16 at the make contact of transfer pair SR1–1 following operation of relay SR1, lead 16 is open at the break contact of transfer pair RS–1, relay RS having previously operated as described above; the second line appearance had previously been made busy by ground applied to sleeve lead 16 at the make contact of transfer pair RS–1. Also, relay SR1 upon operating interrupts at break contact SR1–2 the operate path of relays TR, TRA and H1; closes at make contact SR1–3 a path connecting polar relay PS across the tip and ring of the line at the line finder end; interrupts at break contact SR1–4 the operate path of relay D (already open at break contact RS–6); partially completes at make contact SR1–5 a path for applying tone from source 17 to the line; interrupts at break contacts SR1–7 and SR1–8 the talking path to the first connector appearance; and partially completes at make contact SR1–9 a holding path across the tip and ring of the line.

Relay SR2, operated, locks through its make contact SR2–1 to the ground at the make contact S–1; partially completes at make contact SR2–2 an operate path for relays TR, TRA and H1; interrupts at the break contact of transfer pair SR2–3 the connection of ground to sleeve lead 16 whereby to remove the make busy condition from the second line appearance at hunting connector 15; connects battery through the winding of relay AS to sleeve lead 16 of the second appearance via the make contact of transfer pair SR2–3; and partially completes at make contact SR2–4 a holding path across the tip and ring of the second line appearance.

Summarizing the operations just described, it will be noted that the novel arrangement of the invention is such that here, as in the first type of call described, the second line appearance is held busy (via the make contact of transfer pair RS–1) and the connection of a call-waiting call is accordingly prevented during the completion of an incoming call to the call-waiting customer's station 11. When the call is completed, i.e., answered by the call-waiting customer, however, the make busy ground is removed from sleeve lead 16 (break contacts of transfer pair SR2–3) and the second line appearance at connector 15 becomes available to a call-waiting call connection now that the first incoming call to the call-waiting customer has been answered.

(C) Call-waiting call

Since as pointed out above, connector 15 is a PBX hunting type connector and the first and second line appearances comprise a hunting group, a terminating call will be connected to the second line appearance if the first line appearance is busy, assuming, of course, that the second line appearance is idle when the connection is attempted.

When a call terminates to the second line appearance, auxiliary line relay AS normally operates from ground on lead 16 through the make contact of transfer pair SR2–3 to battery at the relay. Relay AS, operated, opens the operate path of relay SR1 at the break contact of transfer pair AS–1; relay SR1, as previously pointed out, is slow to release and, even though the operate path has been interrupted, the contacts previously closed will remain in circuit closing condition for an appreciable period of time, for example from 190 to 425 milliseconds. Accordingly, high-frequency tone from source 17 is now connected to the call-waiting customer's station through capacitor CHT, make contact SR1–5, make contact of transfer pair AS–2, ring side of line, through the closed station line loop to the tip side of the line, make contact of transfer pair AS–3, make contact SR1–6 to ground. Also, relay AS upon operating interrupts at the break contacts of respective transfer pairs AS–3 and AS–2 the talking path to the original connection, so that the party will not hear the call-waiting tone; closes at make contact AS–4 a holding path for the original connection through resistor RH1 and make contact SR1–9; and partially completes at make contact AS–5 an operate path for relay H2.

The duration of the call-waiting tone as well as the time the talking path to the original connection is interrupted is dependent upon the release period of relay SR1; when this relay has fully released the tone is removed as the tone path is interrupted at make contacts SR1–5 and SR1–6; the talking path to the original connection is reclosed at break contacts SR1–7 and SR1–8; the holding bridge for that connection is opened at make contact SR1–9; the operate path of relay D is reclosed at break contact SR1–4 (but not yet completed); ground is removad from sleeve lead 16 at the make contact of transfer pair SR1–1; and operate path is partially completed at break contact SR1–2 for relays TR, TRA and H1; and the operate path of relay PS is opened at make contact SR1–3 causing this relay to release if operated. (While ground was previously applied to sleeve lead 16 at the make contact of transfer pair SR1–1, the second line appearance was not make busy since lead 16 was open to this ground connection at the break contact of transfer pair SR2–3.)

The call-waiting customer, having been appraised by the call-waiting tone applied to his station line that a second call is waiting to be connected to his line, may either continue with the first call or may elect to transfer to the second call, at least momentarily, probably after making some suitable explanation to the first caller. In the meantime, the "waiting" caller will continue to hear audible ringing tone until such time as a transfer is effected. Transfer operation will be described immediately below.

(D) Transfer to second appearance

For purposes of further disclosure, it will be assumed that the call-waiting customer elects to receive the second call while, at the same time, the original connection is held for reactivation subsequently; the various circuit elements will be considered to be in the condition normal for this stage of the connection as described above.

The call-waiting customer initiates a transfer by momentarily depressing and then releasing the switchhook, i.e., the operation commonly referred to as "flashing." When the switchhook is depressed and the line loop momentarily opened relay S will release. Relay S, released, closes at the break contact S–2. A path for operating relay TR from ground, break contact S–2, break contact SR1–2, lead 23, make contact SR2–2 (relay SR2 has an appreciable slow-to-release characteristic as previously explained), break contact of transfer pair TR–1, winding of relay TR, through resistor TRR to battery; relay TR operates and locks through the make contact of its transfer pair TR–1 to ground at make contact SR2–5. A portion of the path just traced is effective also to operate relay H1; thus, picking up the path at the break contact of transfer pair TR–1, it is further traced through the break contact of transfer pair TRA–1, make contacts RS–5 and SR2–6, winding of relay H1 to battery; relay H1 operates and partially completes at its make contact H1–1 a locking path to become effective following operation of relay TRA as described subsequently. (Relay TRA did not operate over the path traced above through the break contact of transfer pair TR–1 since its operate battery is shunted to ground via the break contact of its transfer pair TRA–8.) Relay H1, operated, also closes at make contact H1–2 an operate path for relay H–2, and partially closes at make contact H1–3 a holding path through resistor RH3 for the original connection.

Relay TR, operated and locked to ground as above described, interrupts at the break contact of its transfer pair TR–1 its original operate path, interrupts at the respective break contacts of transfer pairs TR–2 and TR–3 the talking path for the original connection; closes at the respective make contacts of the same transfer pairs paths for connecting substitute battery and ground to the line for operation of relay S; completes at make contact TR–4 a holding path through resistor RH3 for the original connection; and opens at break contact TR–5 the holding path (not yet completed) through resistor RH2 for the second line appearance. Following operation of relay H2 this path is partly completed at make contact H2–1.

When the switchhook is released at the end of the flash, relay S reoperates and, as the shunt path via the break contact of transfer pair TRA–8 and the break contact S–2 is now removed, relay TRA operates from ground, make contact SR2–5, make contact of transfer pair TR–1, winding of relay TRA through resistor TRRA to battery. Relay TRA, operated, closes a path at the make contacts of respective transfer pairs TRA–3 and TRA–2 for connecting the tip and ring of the second line appearance to the call-waiting customer's line; prepares at the make contacts of respective transfer pairs TRA–5 and TRA–4 an operate path for relay S when a transfer is subsequently effected back to the original connection; closes at make contact TRA–6 an alternate leg in the holding path through resistor RH3 for the original connection; and closes at make contact TRA–7 an alternate holding path for relay H–2.

Ringing is now tripped in the normal manner through the closed loop at the call-waiting customer's set and conversation can now proceed between the call-waiting customer and the second call terminated at the second line appearance of connector 15. The caller on the original connection is held meanwhile by the holding bridge provided through resistor RH3; this caller is excluded from the conversation, however, since the line is open beyond the point of connection of the second appearance tip and ring; specifically the line is open at the respective break contacts of transfer pairs TRA–5 and TRA–4.

(E) Transfer back to original connection

After the call-waiting customer has brought in the second call he may, if he so elects, transfer back to the original connection, provided of course, that the original caller did not hang up in the interim; if such transfer is to be made the second call may be held in the event that conversation has not been completed.

The transfer just referred to is effected by a second momentary depression and release of the switchhook, i.e., a second flash. When the switchhook is depressed and the station loop opened, relay S releases and closes at the break contact S–2 a path via lead 23 shunting the operate battery of relay TR. Relay TR releases and closes at the break contacts of respective transfer pairs TR–3 and TR–2 paths for connecting battery and ground to the line for operating relay S; opens at make contact TR–4 one of the shunt legs of the holding path through resistor RH3; transfers at the contacts of transfer pair TR–1 the holding path for relay TRA and H1 from ground via make contact SR2–5 to ground via the break contact S–2; interrupts at the make contacts of respective transfer pairs TR–2 and TR3 the talking path to the second line appearance, i.e., to the second caller; and completes at break contact TR–5 a path through resistor RH2 for holding that caller.

When the switchhook is again released, relay S reoperates and interrupts at the break contact S–2 the holding path of relays TRA and H1 which relays thereupon release.

Relay TRA, released, opens at make contact TRA–6 the holding bridge through resistor RH3 for the original connection; recloses at the break contacts of transfer pairs TRA–5 and TRA–4 the talking path between the call-waiting customer and the original connection; partially completes at the break contacts of respective transfer pairs TRA–2 and TRA–3 a battery and ground path for relay S; interrupts at make contact TRA–7 one of the alternate holding paths for relay H2; and interrupts at the make contact of transfer pair TRA–8 the previous path shunting relay TR operate battery.

Relay H1, released as just described, interrupts at make contact H1–2 another of the alternate locking paths for relay H2 (which remains operated, however, through its own make contact H2–2); interrupts at make contact H1–1 its locking path via the make contact of transfer pair TRA–1; and opens at make contact H1–3 the holding path through resistor RH3 for the original connection.

The second caller, terminated on the second line appearance at connector 15, is now held by the holding path through resistor RH2 and the talking connection to the call-waiting customer's line is interrupted at make contacts of the released TRA relay; the talking path between the call-waiting customer and the original connection has been re-established at break contacts of the same released relay and the holding bridge through resistor RH3 for the original connection has been removed. Accordingly, conversation between the original caller and the call-waiting customer can now be resumed while the second caller is held at the second line appearance. Subsequent transfers may be effected as desired by switchhook flashes.

(F) Caller on first appearance disconnects while call-waiting customer is connected to second appearance In the situation described above where the call-waiting customer places the first, or original, caller on "hold" and transfers to the second caller in response to the call-waiting tone it may transpire, of course, that the first caller may not wait for reconnection to the call-waiting customer but may hang up, that is go on hook, forthwith. The holding bridge established through RH3 will maintain the path in hold condition to the original connection but will not, of course, prevent the first caller from leaving the connection if he elects to do so. It will be assumed for purposes of further description that the first caller does, in fact, go on hook after the call-waiting customer has transferred to the second caller terminated on the second line appearance at connector 15. In such event, when the first caller, terminated on the first line appearance, goes on hook, relay RS releases.

Relay RS released, releases relay H1 by opening the locking path at make contact RS–5; recloses at the break contact of transfer pair RS–1 a partially completed path for subsequently making busy the second line appearance; opens at make contact RS–7 the operate path of relay SR2 which remains operated, however, over a locking path via its own make contact SR2–1; closes at break contact RS–6 a path for operating relay D; recloses at break contacts RS–2, RS–3 and RS–4 the tip, ring and sleeve connections to line finder 13 (performing no useful function at this point); and opens at make contact RS–9 the shunt release path for relay TR.

Relay H1, released, opens at make contact H1–1 the portion of the earlier locking path through make contact H1–1; opens at make contact H1–2 one of the alternate operate paths for relay H2 (which is held, however, through make contact H2–2); and opens at make contact H1–3 the holding bridge through resistor RH3 previously applied to the original connection; removal of the bridge at this point prevents false operation of the line relay of line finder circuit 13.

Relay D, operated, partially closes at make contact D–1 an operate path for relay SR1; and closes at make contact D–2 a shunt path to battery through diode DD3 whereby to impart to itself (relay D) a slow-to-release characteristic.

Since the first caller has disconnected, the first line appearance at connector 15 is now available to another call; for purposes of further disclosure, it will be assumed that another call, hereinafter referred to also as a third call, is, in fact, terminated at the first line appearance. Relay RS now operates as described above, operates relay SR1 from ground, make contact S–1, make contacts RS–8 and D–1, make contact of transfer pair AS–1, winding of relay SR1 to battery; closes at the make contact of transfer pair RS–1 a path for connecting ground to sleeve lead 16 (open at the break contact of transfer pair SR2–3); opens at break contacts RS–2, RS–3 and RS–4 the connection of the tip, ring and sleeve leads to line finder circuit 13; partially completes at make contact RS–5 an operate path for relay H1; interrupts at break contact RS–6 the operate path of relay D whereby to release that relay; interrupts at the break contact of transfer pair RS–1 one of the operate paths for relay AS; recloses at make contact RS–7 the original operate path of relay SR2 (now held through its make contact SR2–1); and recloses at make contact RS–9 the shunt release paths for relay TR.

Relay SR1, operated, opens at break contacts SR1–7 and SR1–8 the talking path for the call-waiting customer to the second line appearance; closes at make contact SR1–9 a holding bridge through resistor RH1 for the connection terminated at the second line appearance; closes at make contacts SR1–5 and SR1–6 a loop for applying call-waiting tone from source 17 to station set 11 of the call-waiting customer; partially completes at the make contact of transfer pair SR1–1 a path (not completed at this time) for connecting ground to sleeve lead 16 of the second line appearance; interrupts at break contact SR1–2 an operate path of relays TR, TRA and H1; closes at make contact SR1–3 a path for connecting relay PS across the line (performs no useful function at this time); and interrupts at break contact SR1–4 the operate path of relay D, a path already interrupted at break contact RS–6.

The release of relay D is sufficiently slowed by action of the DD3 diode path referred to above that the winding of relay SR1 becomes thoroughly saturated before its energizing path is again opened at make contact D–1. When relay SR1, slow slow-to-release as previously pointed out, finally does release, it recloses at break contacts SR1–7 and SR1–8 the talking path to the second line appearance; opens at make contact SR1–9 the holding bridge through resistor RH1; interrupts at make contacts SR1–5 and SR1–6 the path for applying call-waiting tone to station set 11; opens at the make contact of transfer pair SR1–1 the path (not completed for this type of call) for applying ground to sleeve lead 16 of the second line appearance; partially completes at break contact SR1–2 the operate path for relays TR, TRA and H1; interrupts at make contacts SR1–3 the connection of relay PS across the line; partially recloses at break contact SR1–4 the operate path of relay D (still open at break contact RS–6).

The call-waiting customer if he so desires can now transfer to the new (third) call by again flashing his switchhook as described above. The release of relay S following depression of the switchhook closes at the break contact S–2 a ground shunting path for the operate battery of relay TR and that relay accordingly releases. Relay TR, released, closes a path for reoperating relay S from battery resistor RR, make contact of transfer pair TRA–4, break contact of transfer pair TR–3, windings of relay S and closed station loop, break contact of transfer pair TR–2, make contact of transfer pair TRA–5, resistor RT to ground. Also, relay TR upon releasing opens at make contact TR–4 one of the shunt legs of the holding bridge through resistor RH3 (already open at make contact H1–3); transfers the holding path for relay TRA at transfer pair TR–1 from ground at make contact SR2–5 to ground at break contact S–2; opens at the break contacts of respective transfer pairs TR–2 and TR–3 the talking path to the second line appearance at connector 15; and closes at break contact TR–5 the holding bridge through resistor RH2 for the second line appearance.

When the switchhook is released at the end of the momentary operation or flash, relay S reoperates and, in turn, releases relay TRA by opening at the break contact S–2 the holding path for relay TRA. Relay TRA, released, interrupts at make contact TRA–6 one of the alternate legs in the bridge path through resistor RH3; closes at the break contacts of respective transfer pairs TRA–5 and TRA–4 the line between the call-waiting customer and the call terminated at the first line appearance at connector 15; partially completes at the break contacts of respective transfer pairs TRA–2 and TRA–3 a battery-ground path for subsequent reoperation of relay S; partially completes at the break contact of transfer pairs TRA–8 and TRA–1 operate paths for relays TR and H1; and interrupts at make contact TRA–7 one of the holding paths of relay H2 which holds operated, however, through its make contact H2–2.

As the line is now cut through between the call-waiting customer and the additional (third) call terminated at the first line appearance, ringing is tripped and conversation may take place between the call-waiting customer and the new call (third call) terminated at the first line appearance; the caller terminated at the second line appearance is held by the bridge through resistor RH2 but is excluded from the present talking connection at make contacts of transfer pairs TRA–3 and TRA–2 since relay TRA is in released position.

In the event a customer terminated at the first line appearance disconnects, i.e., goes on hook, while the call-waiting customer is connected to a call terminated at the second appearance, and the first appearance remains idle,, the circuit cannot be transferred in error to the idle first appearance. Relay RS will be in released position under this condition and, accordingly, a path will not be closed at make contact RS–9 for releasing relay TR at the time relay S releases as the result of a switchhook flash.

(G) Caller on second line appearance disconnects while the line is connected to first appearance on line finder In the event the call terminated at the second line appearance had not yet been answered by the call-waiting customer at the time the caller hangs up, release by the caller will release relay AS and relay SR1 will then reoperate from ground, make contact S–1, break contact of transfer pair AS–1, winding of relay SR1 to battery. A path is accordingly partially completed at make contacts SR1–5 and SR1–6 for subsequent connection of call-waiting tone to call-waiting customer's set 11 in the event that a new call terminates at the second line appearance. Ensuing operations will then be as previously described in detail above.

In the event that the above referred to call had been answered by the call-waiting customer who subsequently transferred to a call terminated at the first appearance or the line finder, a holding bridge will be established through resistor RH2 for the connection at the second line appearance since relays H2 and SR2 are in operated position under these circumstances. When the caller goes on hook, connector 15, assumed to be arranged for timed disconnect in the well-understood manner, will time out and remove ground from sleeve lead 16 whereby to release relay AS. Relay AS, released, interrupts at make contacts AS–5 the holding path for relay H2 which releases and opens at make contact H2–1 the holding bridge through resistor RH2 for the second line appearance. Also, relay AS upon releasing closes at the break contact of transfer pair AS–1 a path for reoperating relay SR1 whereby to prepare a path for applying call-waiting tone to the line when a new call terminates at connector 15.

(H) Disconnect without answering a call on the second appearance

It may be that, in a situation such as previously described when the call-waiting customer has been appraised that a call is waiting on the second line appearance, he may elect to make a new call without first accepting the waiting call. In such event, the call-waiting customer can effect such procedure by depressing the switchbook for a minimum period of from 1.5 to 2 seconds before the new call is initiated. The operation of the circuit under this condition will vary depending on the situations prevailing at the time on the various appearances of the circuit as described below.

Assuming first that the original call had been initiated by the call-waiting customer, relays S, SR2, LFS and AS will be in operated position; the respective operate paths have been previously described above and need not be again traced at this point. When the switchhook is depressed for initiation of the disconnect the line loop is opened at the station and relay S releases; the portions of the switch train 14 associated with the line finder appearance of this circuit also restore to normal position causing the release of relay LFS.

Relay S, released, closes at the break contact S–2 a previously described operate path for relay TR and interrupts at the make contact S–1 the holding path of relay SR2. Relay SR2, as previously discussed, has an appreciable slow-to-release characteristic but in the event that the switchhook is held depressed for a period of from 1.5 to 2 seconds and relay S remains released for such period, relay SR2 will fully release. Relay SR2, released, releases relay TR by interrupting the operate path at make contact SR2–2, and transfers the operate path for relay AS to the break contact of transfer pair RS–1, relay RS being in released position at this point; relay AS remains operated over this new path. Relay TR, released, recloses at the break contacts of transfer pairs TR–2 and TR–3 the call-waiting customer's station loop to the line relay associated with line finder circuit 13.

Now when the switchhook is released at the end of the flash operation relay S operates and closes at the make contact S–1 a path for operating relay D which performs no useful function at this time however. Relay SR1 does not operate at this time as the operate path is open at the break contact of transfer pair AS–1 and at make contact RS–8, relay AS being operated and relay RS being released. Also, relay SR2 does not operate since the operate paths are open at make contacts PS–1 and RS–7. The line finder now functions in the normal manner to "find" the line and provide dial tone to the call-waiting customer.

Relay LFS operates at this point and makes busy the first line appearance at connector 15 by connecting ground to sleeve lead 19 at the make contact of transfer pair LFS–1. Relay PS is not connected across the line, since relay SR1 has not operated, and, accordingly, relay SR2 does not operate when the called station answers (that is the previously effective operate path is open at make contact PS–1). It is not, in fact, necessary that relay SR2 operate at this time in the present connection since the second line appearance at connector 15 is already held busy by the switch connected to it and the slow release feature of the relay is not required since the call-waiting customer cannot transfer to the second line appearance since it is already busied.

If the unanswered call terminated at the second line appearance goes on hook while relays S and SR2 are in released position, relay AS releases and the circuit is completely restored to normal. In the event the unanswered call does not disconnect until after relay S has reoperated, relay AS, released, then closes a path at the break contact of transfer pair AS–1 for operating relay SR1 thereby restoring the circuit to the condition normal for a call originated by the call-waiting customer's station.

In the event the original call had been incoming to the call-waiting customer's station via the first line appearance at connector 15, relays S, SR2, RS and AS will be operated over paths previously described above. When relay S now releases on the switchhook depression or flash, it closes previously described paths for operating relays TR and H1 and, at the same time, interrupts the operate path of relay SR2. Relay TR, operated, interrupts at the break contacts of respective transfer pairs TR–2 and TR–3 the talking path to the first line appearance and partially completes at make contact TR–4 a holding bridge through resistor RH3 for the first line appearance connection. The bridge is completed at make contact H1–3; relay H1 operated also closes at make contact H1–2 an operate path for relay H–2 which operates and locks through its make contact H2–2. Relay H2, operated, partially completes at make contact H2–1 a holding bridge through resistor RH2 for the second line appearance connection.

Assuming that the switchhook is held depressed for a sufficient period to permit slow release relay SR2 to completely release, the subsequent action will depend upon whether or not the caller terminated on the first line appearance has gone on hook, i.e., has disconnected. In the event this party does disconnect before relay SR2 has released, the connector connected to the first line appearance is held by the holding bridge through resistor RH3 until relay SR2 does release at which point the operate path for relays TR and H1 is opened at make contact SR2–2 and relays TR and H1 release. The holding path through resistor RH3 is now opened and the connector releases, releasing in turn relay SR. Relay RS, released, provides at the break contact of transfer pair RS–1 a holding path for relay AS.

Relay SR2, released, opens at make contact SR2–4 the holding bridge through resistor RH2 for the second line appearance connection. Ringing is tripped on the unanswered call following release of relay TR.

In the event the caller terminated on the first line appearance has not gone on hook before relay SR2 has released, the release of relay SR2 when it does occur will in turn release relays TR, H1 and AS. Relay H1, released, interrupts an operate path of relay H2 at make contact H1–2. The circuit is now in fully normal condition except for the still operated RS relay. Ground is provided on sleeve lead 16 to hold that circuit busy if the call on that appearance is disconnected. If the first party now goes on hook relay RS will release and close a path at the break contact of transfer pair RS–1 for reoperating relay AS which, however, performs no useful function at this time.

Should the call-waiting customer release the switchhook at the completion of the flash before the caller terminated on the first line appearance has disconnected, relay AS will be in released position and relay S upon operating will close paths at the make contact S–1 for operating relays SR1 and SR2. Relay SR1, operated, will partially complete at make contacts SR1–5 and SR1–6 the path for applying call-waiting tone to the line, while relay SR2 upon operating closes at the make contact of transfer pair SR2–3 a path for reoperating relay AS. Relay AS, operated, interrupts at the break contact of transfer pair AS–1 the operate path of slow-to-release relay SR1 which starts to release, and completes at the make contacts of respective transfer pairs AS–2 and AS–3 the path for applying call-waiting tone to station set 11; tone is applied during the time required for full release of relay SR1 at which point the tone path is interrupted. Also during this release period a holding bridge through resistor RH1 is connected across the first connection through make contact SR1–9. It will be evident, therefore, that the call-waiting customer cannot initiate a further call as long as the customer who initiated the first call remains connected to the first line appearance.

In the event the party on the first connection has disconnected before the call-waiting customer releases the switchhook at the completion of the flash, relays AS and H2 will be in operated position. Upon release of the switchhook, line finder 13 will find the line in the usual and well understood manner and relay LFS will operate. Relay LFS, operated, closes a path at the make contact of transfer pair LFS–1 for connecting ground to sleeve lead 19 whereby to make busy the first line appearance. Relay D, which operated momentarily following operation of relay S but performed no useful function, releases following operation of relay LFS since the operate path is interrupted at break contact LFS–2.

Relay SR1 does not operate at this point since relay AS is operated and relay RS released and the possible operate paths for relay SR1 are open at the break contact of transfer pair AS–1 and at make contact RS–8. Similarly, relay SR2 does not operate since the possible operate paths are open at make contacts RS–7 and PS–1. Since relay PS is not bridged across the connection at this point it does not operate when the called station answers and relay SR2 does not operate as the operate path is not closed at make contact PS–1. (It is not required that relay SR2 operate at this time since the second connector is already held busy by the switch connected to it nor is the slow release feature of the relay required since the call-waiting customer cannot transfer to the second line appearance under this condition.)

In the event the caller terminated on the second line appearance disconnects while relay S is in released position and while the party terminated on the first line appearance is still connected, the second line appearance will be held busy at the ground connected to sleeve lead 16 via the make contact of transfer pair RS–1, and the call-waiting customer will be prevented from initiating a new call until relay RS has released as discussed above. When the caller terminated at the first line appearance has disconnected relay RS will release and restore the circuit to normal condition.

In the event the call terminated on the second line appearance releases after relay S has reoperated and the party on the first connection has not gone on hook, the circuit conditions are such that a new call can come in in the normal manner. If the party on the first connection has disconnected and a new call is established through line finder circuit 13, relay AS, released, will close an operate path for relay SR1 at the break contact of transfer pair AS–1; relay PS is then connected across the line over a path closed at make contact SR1–3. Also relay SR1, operated, makes busy the second line appearance by connecting ground to lead 16 at the make contact of transfer pair SR1–1, this being on the assumption that the party called has not yet answered on the first line appearance. However, if this party has answered, relay PS operates and closes at make contact PS–1 an operate path for relay SR2. Relay SR2, operated, interrupts at the break contact of transfer pair SR2–3 the connection of ground to sleeve lead 16 whereby to remove the make busy condition from the second line appearance at connector 15. From this point on the circuit will function as on a regular call.

The release functions effective for the various circuit arrangements will be apparent from earlier portions of the detailed description.

It will be clear from the above description that the novel arrangement contemplated by my invention provides an efficient and easily adapted method of making feasible the provision of call-waiting service in a step-by-step telephone system. The auxiliary line circuit used in conjunction with each special service line is simple in nature and inexpensive in structure. Since one basic step in operation of the circuit is controlled by a function inherent in step-by-step systems, i.e., reversal of battery potential supplied over the line to the calling customer upon answer by the called party, it becomes apparent that provision of the described arrangement does not involve any expensive or complicated modifications whatsoever in the overall system arrangement.

While specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a telephone switching system of the type including a step-by-step switch train and a hunting type connector, a special service line having two consecutive appearances at the connector, a station set connected to said line, means effective when one of said appearances is busied for terminating a call to said special service line at the other of said appearances, means controlled through the step-by-step switch train for inhibiting the action of said last-mentioned means during the time the busied condition is caused by a connection already originated but not yet completed, a supervisory relay operable over said special service line, a high impedance polarized relay, and means effected by operation of said supervisory relay for connecting said polarized relay across said special service line.

2. In a telephone switching system, the combination defined by claim 1 further characterized in means effective upon completion of a connection originated over said special service line for operating said polarized relay, and means effective upon operation of said polarized relay for rendering said inhibiting means ineffective.

3. In a telephone switching system, the combination defined by claim 2 further characterized in that said means for operating said polarized relay includes means for reversing the battery potential on said special service line.

4. In a telephone switching system, the combination defined by claim 3 further characterized in a tone source and means effective only when said special service line is closed through said station set and when said inhibiting means is ineffective for applying tone from said source to said special service line.

References Cited

UNITED STATES PATENTS 3,133,995 5/1964 Zarouni ............ 179—84

WILLIAM C. COOPER, Primary Examiner

U.S. Cl. X.R.

179—84